United States Patent [19]
Wahl

[11] Patent Number: 5,957,588
[45] Date of Patent: Sep. 28, 1999

[54] AIR BEARING FOR A SPINDLE

[75] Inventor: Michael Wahl, San Diego, Calif.

[73] Assignee: Phase Metrics, Inc., San Diego, Calif.

[21] Appl. No.: 08/999,417

[22] Filed: Dec. 29, 1997

[51] Int. Cl.$^6$ .................................................. F16C 32/06
[52] U.S. Cl. ............................................ 384/108; 384/109
[58] Field of Search ..................................... 384/108, 109,
384/107, 100, 110, 111, 112, 113, 114,
118, 291

[56] References Cited

U.S. PATENT DOCUMENTS

| | | | |
|---|---|---|---|
| 2,919,960 | 1/1960 | Whitney | 384/108 |
| 3,385,641 | 5/1968 | Foglia | 384/118 |
| 3,622,213 | 11/1971 | Onsrud | 384/108 |
| 4,095,855 | 6/1978 | Fox | 384/109 |
| 4,671,676 | 6/1987 | Chen et al. | 384/100 |
| 5,692,840 | 12/1997 | Rhoton et al. | 384/110 |
| 5,789,839 | 8/1998 | Langenbeck | 384/108 X |
| 5,801,464 | 9/1998 | Brezoczky | 384/108 X |

FOREIGN PATENT DOCUMENTS 212277  3/1987  European Pat. Off. ............... 384/109

*Primary Examiner*—Thomas R. Hannon
*Attorney, Agent, or Firm*—Blakely Sokoloff Taylor & Zafman

[57] ABSTRACT

A self-acting air bearing for a pressurized spindle air bearing includes a bearing that is located within a cavity of a housing. The bearing and cavity may be shaped as a segment of a sphere. The spindle may be connected to a pressurized air source which creates an air bearing within a gap that separates the bearing from the housing. The bearing is attached to a shaft that is rotated by a motor. Rotation of the bearing creates a flow of air within the gap. The cavity and/or bearing may have a slot which cooperates with the air flow to increase the pressure of the air bearing.

8 Claims, 3 Drawing Sheets

AIR BEARING FOR A SPINDLE

BACKGROUND OF THE INVENTION

1. Field of the Invention

The present invention relates to air bearing spindles used for disk media test equipment such as disk certifiers.

2. Background Information

Hard disk drives contain magnetic recording heads that magnetize and sense the magnetic field of rotating disks. Each disk is constructed from a substrate that is coated with magnetic material. Manufacturing tolerances and process variations may vary the magnetic properties of the disks. It is desirable to test the disks to insure compliance with design specifications.

The disks are typically tested on an apparatus commonly referred to as a disk certifier in a process commonly referred to as "disk certification". Disk certifiers commonly use a spindle to rotate a disk adjacent to a magnetic recording head. The spindles used to spin the disk under test usually employ an air bearing due to the tight tolerances necessary for disk certification. The recording head writes and then reads data from the rotating disk. The data is then analyzed by test circuitry to determine whether the disk meets desired design specifications.

The disks are typically mounted onto the spindle by a robotic arm. There is a concern that the robotic arm may strike and damage the spindle. A damaged spindle may wobble and create a run-out in the disk. The disk run-out will reduce the accuracy of the test. It is therefore desirable to provide a spindle that is rugged enough to withstand the force of a robotic arm or other abuses to the spindle motor during the process of disk certification.

The air bearing of the spindle is typically created by providing pressurized air to a gap which separates a bearing (s) from a spindle housing. The pressurized air is typically providing by a pressurized air source at the site facility where the certifier is located. It has been found that some sites have lower air pressure than other sites. For example, air pressure provided by facilities within Japan is typically 60 psi. This is to be contrasted with sites within the United States where the air pressure can be 110 psi. The lower air pressure at the Japanese facilities will result in an air bearing which has a lower stiffness than air bearings created within the same spindle at a site within the United States. It would be desirable to provide a spindle with an air bearing that is stiffer than air bearings of the prior art. It would also be desirable to provide a pressurized air bearing spindle that also contains a self-acting air bearing characteristic to compensate for facility sites which have relatively low air pressure. It would also be desirable to provide an air bearing spindle that increases stiffness with an increase in speed to minimize instabilities or vibration in the spindle.

SUMMARY OF THE INVENTION

A spindle which has a bearing that is located within a cavity of a housing. The bearing is attached to a shaft. The bearing and shaft are both rotated by a motor. The rotation of the bearing creates a flow of air within a gap between the housing and the bearing. Either the bearing and/or the housing cavity have a slot which cooperates with the air flow to increase the pressure within the gap.

DETAILED DESCRIPTION OF THE INVENTION

One embodiment of the present invention provides a self-acting air bearing characteristic for a pressurized spindle air bearing. The spindle includes a bearing that is located within a cavity of a housing. The bearing and cavity may be shaped as a segment of a sphere. The spindle may be connected to a pressurized air source which creates an air bearing within a gap that separates the bearing from the housing. The bearing is attached to a shaft that is rotated by a motor. Rotation of the bearing creates a flow of air within the gap. The cavity and/or bearing may have a slot which cooperates with the air flow to increase the pressure of the air bearing.

Figure 1:
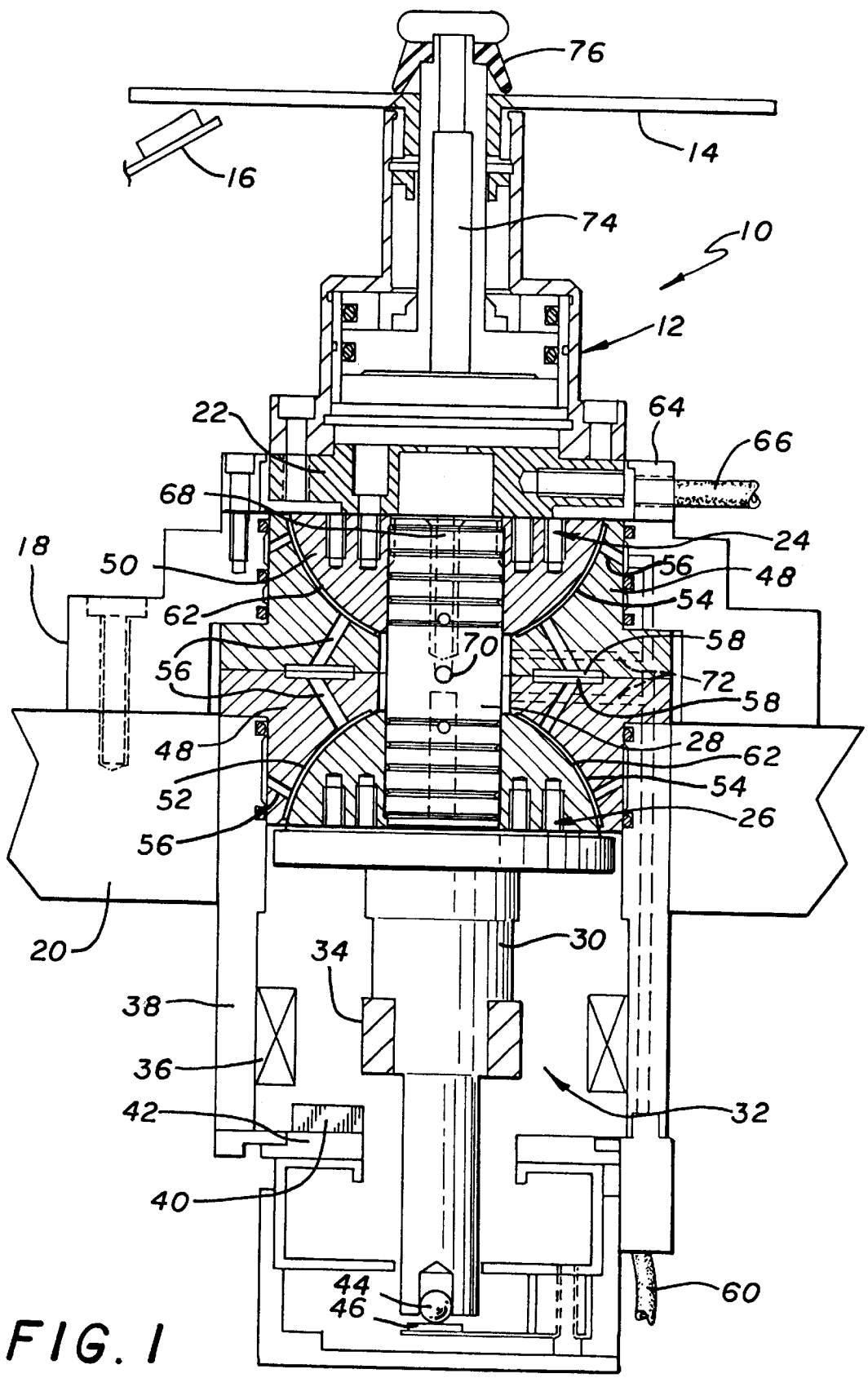
FIG. 1 is a side cross-sectional view of a spindle of the present invention.

Referring to the drawings more particularly by reference numbers, FIG. 1 shows a spindle 10 of the present invention. The spindle 10 may be part of a disk certifier which test magnetic disks that are assembled into hard disk drives. The spindle 10 includes a chuck 12 that captures a magnetic disk 14. The spindle 10 rotates the disk 14 relative to a magnetic recording head 16. The recording head 16 magnetizes and then senses the magnetic fields of the disk 14 in accordance with a disk certification test routine. The recording head 16 is coupled to electronic circuitry which can analyze test signals from the head 16 to determine whether the disk 14 meets predetermined design criteria. Although a disk certifier is shown and described, it is to be understood that the spindle 10 may be used in other systems such as magnetic head testers and flying height testers.

The spindle 10 may contain an outer housing collar 18 that is bolted to a table 20. The chuck 12 is fastened to a mounting plate 22 that is attached to a first bearing 24. The first bearing 24 is connected to a second bearing 26 by a shaft 28. The second bearing 26 is attached to a spindle shaft 30 of an electric motor 32.

The electric motor 32 includes a magnet assembly 34 that is attached to the spindle shaft 30 and coupled to a coil assembly 36. The coil assembly 36 is fastened to an outer motor housing 38. The motor 32 rotates the spindle shaft 30, bearings 24 and 26 and chuck 12 to spin the disk 14. The motor 32 may have an encoder 40 that is mounted to an end plate 42. The end plate 42 can be rotated to adjust the position of the encoder 40. The spindle 30 is in contact with a ground button 44 that is connected to a grounding plate 46.

The bearings 24 and 26 rotate relative to a housing 48. The first bearing 24 is located within a first cavity 50 of the housing 48. The second bearing 26 is located within a second cavity 52 of the housing 48. Both the bearings 24 and 26 and the cavities 50 and 52 may each have a shape that is a segment of a sphere. The spherical bearings 50 and 52, and housing 48 preferably have a hard anodized outer surface.

Figure 2:
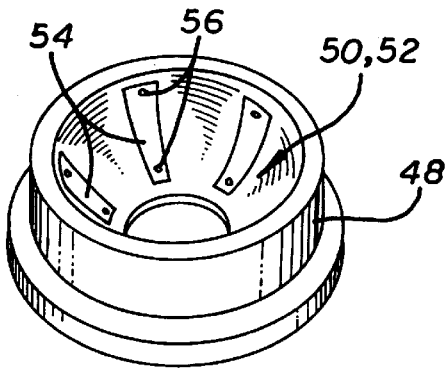
FIG. 2 is a perspective view showing an inner cavity of the spindle.

As shown in FIG. 2, each cavity 50 and 52 has a plurality of slots 54 that extend about the circumference of the cavity 50. In one embodiment, there are six slots 54 equally spaced about the cavity 50. Each slot 54 may have a pair of openings 56.

The housing 48 has a plurality of air bearing channels 58 that terminate at the openings 56 within the cavities 50 and 52. The channels 58 are in fluid communication with a positive air pressure hose 60. The positive air pressure hose 60 is coupled to a source of positive air pressure (not shown) such as an air supply line of an industrial facility. The radius of the bearings 24 and 26 is slightly smaller than the radius of the cavities 50 and 52 to create gaps 62 between the bearings 24 and 26 and the housing 48. The hose 60 provides air pressure that creates pressurized air bearings within the gaps 62 between the housing 48 and the bearings 24 and 26. The air bearings allow the bearings 24 and 26 to rotate relative to the housing 48 without creating mechanical wear between the components.

Rotation of the bearings 24 and 26 by the motor 32 creates a flow of air within the gaps 62. The slots 54 create a change in area within each gap 62 for the air flowing about the circumference of the bearings 24 and 26. The change in area increases the pressure within the gaps 62. The increase in pressure increases the stiffness of the air bearings. The slots 54 are symmetrical so that the invention provide a bi-directional self-acting air bearing which operates whether the motor 32 is rotating the bearings 24 and 26 clockwise or counterclockwise.

Referring to FIG. 2, the slots 54 preferably do not extend to the ends of the cavity 50 so that the slots 54 are essentially enclosed by the housing 48 and the bearing 24. In one embodiment, the combined widths of the slots 54 within a cavity 50 or 52, is approximately one-fourth of the circumferential distance around the cavity 50 or 52 (i.e. $2\pi r$).

Figure 3A:
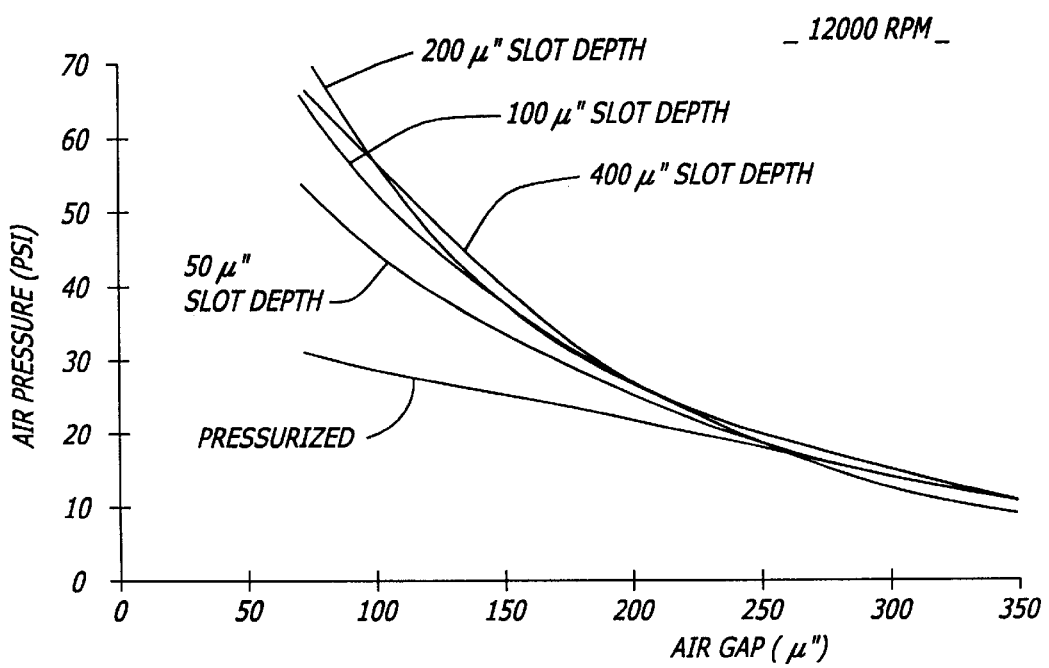
FIG. 3a is a graph showing air bearing pressure versus air gap thickness for air bearing slots of varying depths.

FIG. 3a is a graph which shows calculated air bearing pressure versus air gap thickness for slots 54 of various depths. The bottom curve is for an air bearing interface which has no slots 54. The graph generally shows an increase in air bearing pressure with a decrease in air gap thickness. The graph also shows an increase in pressure for deeper slot depths. The various curves converge at an air gap depth of approximately 250 microinches. For air gaps larger than 250 microinches the existence of the slots 54 was not calculated to increase the air bearing pressure.

Figure 3B:
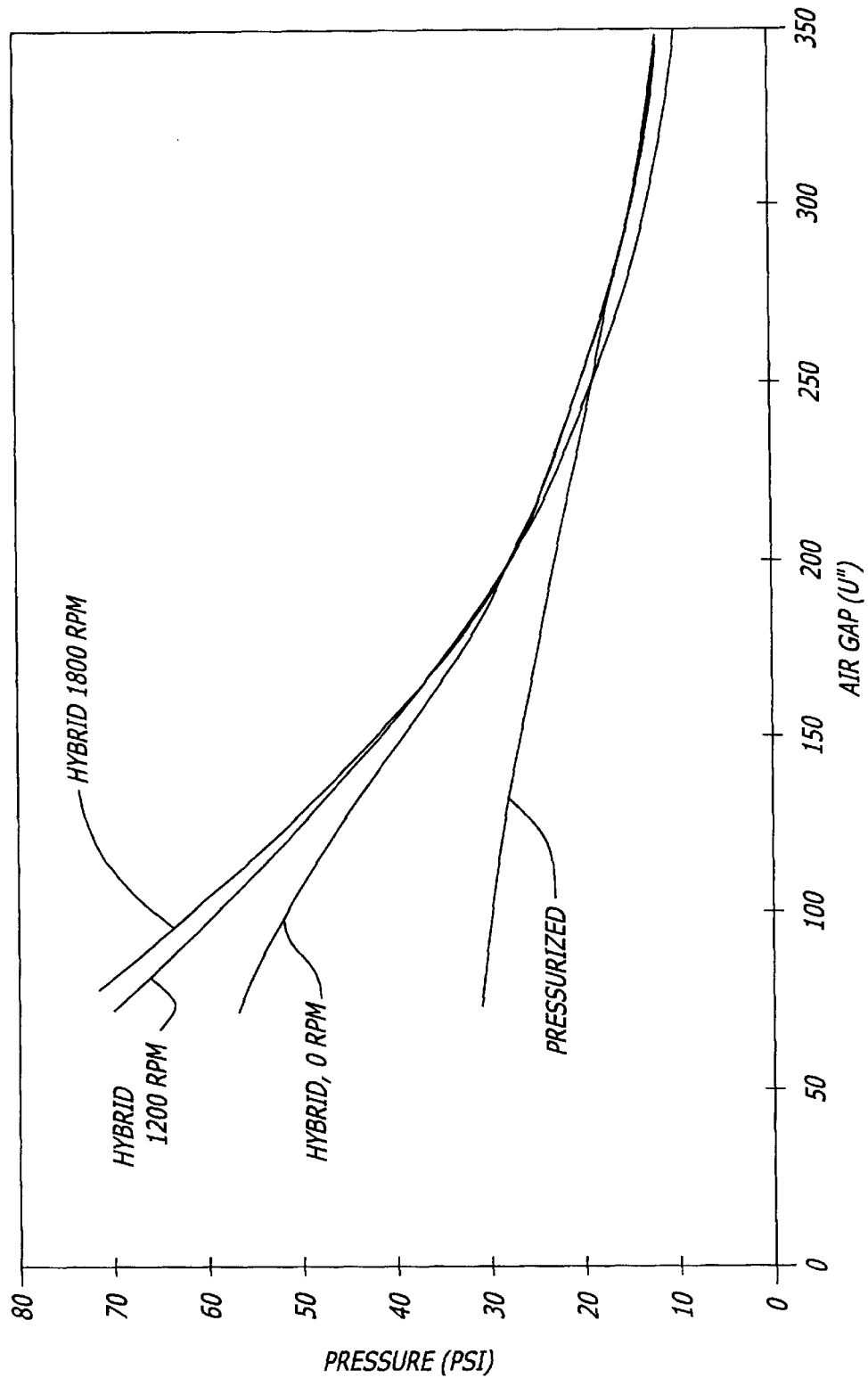
FIG. 3b is a graph showing air bearing pressure versus air gap thickness for varying spindle speeds.

FIG. 3b is a graph which shows calculated air bearing pressure versus air gap for varying spindle speeds. As shown by the graph, the stiffness of the air bearing increases with an increase in speed. The increase in stiffness minimize instabilities and vibration in the spindle 10.

Referring to FIG. 1, the motor 10 may have a vacuum gland 64 that is mounted to the outer collar 18. The vacuum gland 64 is attached to a vacuum hose 66. The vacuum hose 66 provides a return line for the air of the air bearings. The vacuum line 64 will also draw out any particles that are created by the bearing surfaces of the spindle 10 to insure that the disk 14 is not contaminated.

The connecting shaft 28 may have a longitudinal air passage 68 that is in fluid communication with a pair of outer openings 70 located on opposing sides of the shaft 28. The outer openings 70 are in fluid communication with air channels 72 that are coupled to a valve controlled positive air supply (not shown). The positive air supply can provide air pressure which actuates a piston 74 within the chuck 12. Actuation of the piston 74 moves a rubber collar 76 in an upward direction and releases the disk 14. When the air pressure within passage 68 is reduced the collar 76 returns to grasp the disk 14.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Figure 4:
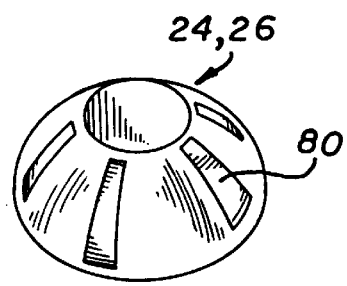
FIG. 4 is a perspective view of an alternate embodiment of a bearing of the spindle.

For example, as shown in FIG. 4, the bearings 24 and 26 may have slots 80 to increase the pressure within the gap between the bearings 24 and 26 and the housing 48. The slots 80 within the bearings 24 and 26 may be used with a design that has slots 54 within the cavities 50 and 52, or an embodiment wherein the cavities 50 and 52 do not have slots 54.

Additionally, although the spindle is shown and described as being connected to a positive air supply. It is to be understood that the spindle may not be connected to an air supply, whereby the slots 54 create a self-acting air bearing between the spherical bearings 24 and 26 and the housing 48.

What is claimed is:

1. A spindle, comprising:
   a housing which has a first slot located within a first cavity;
   a first bearing that is located within said first cavity and separated from said housing by a gap that has a thickness no greater than 250 microinches;
   a shaft that is attached to said first bearing; and,
   a motor that rotates said shaft and said first bearing, said rotation of said first bearing creates a flow of air that cooperates with said first slot to increase a pressure of said gap.

2. The spindle as recited in claim 1, wherein said first cavity has an opening that is coupled to a source of positive air pressure.

3. The spindle as recited in claim 1, further comprising a vacuum chuck that is coupled to said shaft.

4. The spindle as recited in claim 1, further comprising a second bearing that is attached to said shaft and located within a second cavity of said housing, said second cavity having a second slot.

5. A spindle, comprising:
   a housing which has a first cavity;
   a first bearing that has first slot and is located within said first cavity, said first bearing being separated from housing by a gap that has a thickness no greater than 250 microinches;
   a shaft that is attached to said first bearing; and,
   a motor that rotates said shaft and said first bearing, said rotation of said first bearing creates a flow of air that cooperates with said first slot to increase a pressure of said gap.

6. The spindle as recited in claim 5, wherein said first cavity has an opening that is coupled to a source of positive air pressure.

7. The spindle as recited in claim 5, further comprising a vacuum chuck that is coupled to said shaft.

8. The spindle as recited in claim 5, further comprising a second bearing that is attached to said shaft and located within a second cavity of said housing, said second bearing having a second slot.

* * * * *